(12) United States Patent  
Kobayashi

(10) Patent No.: US 9,118,871 B2
(45) Date of Patent: Aug. 25, 2015

(54) IMAGE FORMATION APPARATUS

(71) Applicant: Oki Data Corporation, Tokyo (JP)

(72) Inventor: Yasushi Kobayashi, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/155,403

(22) Filed: Jan. 15, 2014

(65) Prior Publication Data

US 2014/0204435 A1  Jul. 24, 2014

(30) Foreign Application Priority Data

Jan. 23, 2013 (JP) ................................. 2013-009942

(51) Int. Cl.
*H04N 1/60* (2006.01)
*H04N 1/54* (2006.01)

(52) U.S. Cl.
CPC ....................................... *H04N 1/54* (2013.01)

(58) Field of Classification Search
None
See application file for complete search history.

(56) References Cited

U.S. PATENT DOCUMENTS

2005/0024399 A1* 2/2005 Fukuda et al. ..................... 347/9
2009/0097046 A1* 4/2009 Ohta et al. ...................... 358/1.9
2010/0165398 A1 7/2010 Watanabe
2011/0090521 A1* 4/2011 Ohta et al. ...................... 358/1.9
2012/0229819 A1* 9/2012 Koyatsu et al. ................ 358/1.1
2012/0268758 A1 10/2012 Watanabe
2013/0016378 A1* 1/2013 Iguchi ........................... 358/1.9
2013/0242350 A1* 9/2013 Yoshida et al. ............... 358/3.24
2015/0070738 A1* 3/2015 Itoh .............................. 358/523

FOREIGN PATENT DOCUMENTS

JP  2010-152209 A  7/2010

* cited by examiner

*Primary Examiner* — Kimberly A Williams

(74) *Attorney, Agent, or Firm* — Marvin A. Motsenbocker; Mots Law, PLLC

(57) ABSTRACT

An image formation apparatus, for forming an image using color developers and a transparent developer, includes: a color developer threshold memory unit configured to store a color developer maximum threshold for each point of interest; a transparent developer threshold memory unit configured to store a transparent developer threshold for each point of interest; and an image signal converter configured to make color correction of the color developers in received image data when the image data contains a portion where a total amount of the color developers exceeds a color developer maximum threshold, and issue an instruction to apply the transparent toner to a portion where the total amount is not more than the transparent developer threshold.

11 Claims, 11 Drawing Sheets

FIG.7A <BEFORE SUBJECTED TO TOTAL AMOUNT RESTRICTION>
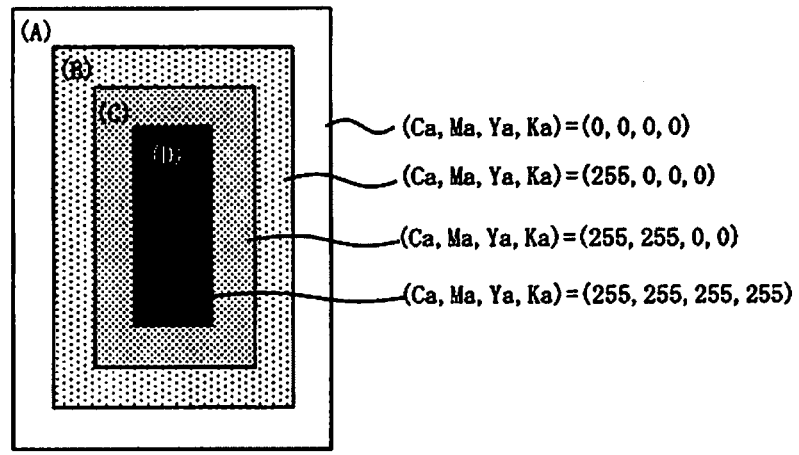
FIG.7B <AFTER SUBJECTED TO TOTAL AMOUNT RESTRICTION (240%)>
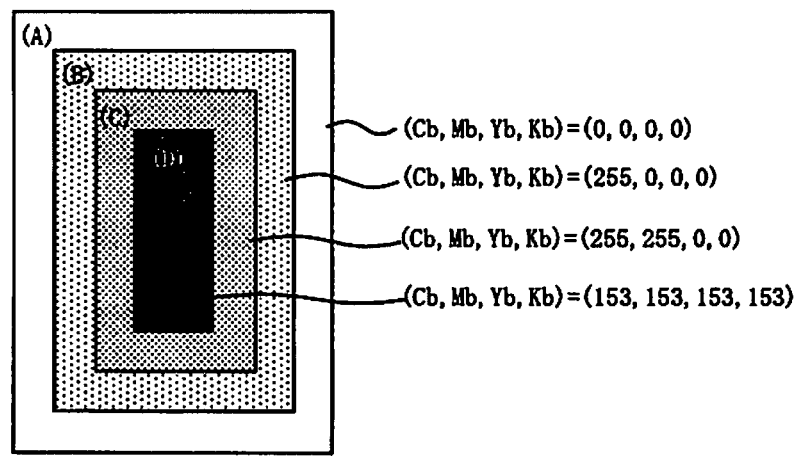

FIG.8

RELATIONSHIP BETWEEN TRANSPARENT TONER AMOUNT THRESHOLD AND TRANSPARENT IMAGE SIGNAL VALUE

| REGION | CMYK VALUE AFTER SUBJECTED TO TOTAL AMOUNT RESTRICTION (Cb, Mb, Yb, Kb) | IMAGE SIGNAL TOTAL VALUE (TOTAL AMOUNT) | TRANSPARENT IMAGE SIGNAL VALUE Clb (TRANSPARENT TONER AMOUNT) | | | | | |
|---|---|---|---|---|---|---|---|---|
| | | | TRANSPARENT TONER AMOUNT THRESHOLD 0 (0%) | TRANSPARENT TONER AMOUNT THRESHOLD 255 (100%) | TRANSPARENT TONER AMOUNT THRESHOLD 510 (200%) | TRANSPARENT TONER AMOUNT THRESHOLD 612 (240%) | TRANSPARENT TONER AMOUNT THRESHOLD 714 (280%) |
| A | (0, 0, 0, 0) | 0 (0%) | 0 (0%) | 255 (100%) | 255 (100%) | 255 (100%) | 255 (100%) |
| B | (255, 0, 0, 0) | 255 (100%) | 0 (0%) | 0 (0%) | 255 (100%) | 255 (100%) | 255 (100%) |
| C | (255, 255, 0, 0) | 510 (200%) | 0 (0%) | 0 (0%) | 0 (0%) | 102 (40%) | 204 (80%) |
| D | (153, 153, 153, 153) | 612 (240%) | 0 (0%) | 0 (0%) | 0 (0%) | 0 (0%) | 102 (40%) | ent 2.
IMAGE FORMATION APPARATUS

CROSS REFERENCE TO RELATED APPLICATIONS

This application claims priority based on 35 USC 119 from prior Japanese Patent Application No. 2013-009942 filed on Jan. 23, 2013, entitled "IMAGE FORMATION APPARATUS", the entire contents of which are incorporated herein by reference.

BACKGROUND OF THE INVENTION

1. Field of the Invention

The disclosure relates to image formation apparatuses, and more particularly, to an image formation apparatus capable of adjusting image glossiness using a transparent toner in addition to cyan, magenta, yellow and black color toners.

2. Description of Related Art

Conventionally, there have been image formation apparatuses for printing using cyan (C), magenta (M), yellow (Y), and black (K) color toners (hereinafter referred to as CMYK color toners), and a transparent toner (for example, see Japanese Patent Application Laid-Open No. 2010-152209 (Pages 2 to 3, FIG. 1).

Some of the conventional image formation apparatuses that are capable of printing using CMYK color toners and a transparent toner create a histogram based on signal values of CMYK pixels contained in received image data, and select one of the following three printing modes on the basis of the histogram:

(1) if the highlight region including the non-printing portion is small, then printing is made with CMYK color toners at a low speed for glossiness;

(2) if the highlight region including the non-printing portion is large, then printing is made with CMYK color toners and a transparent toner at the normal speed; and (3) if the region is large where a total amount of CMYK toners and a transparent toner superposed on the CMYK color toner image exceeds an upper limit total amount for the image formation apparatus, then printing is made twice (in two passes) with CMYK color toners at normal speed plus a transparent toner at normal speed.

However, for an image formation apparatus that adjusts image glossiness using a transparent toner in addition to color toners, it is difficult to obtain a glossy image by applying the transparent toner efficiently and effectively.

SUMMARY OF THE INVENTION

An aspect of the invention is an image formation apparatus for forming an image using color developers and a transparent developer. The image formation apparatus includes: a color developer threshold memory unit configured to store a color developer maximum threshold for each point of interest; a transparent developer threshold memory unit configured to store a transparent developer threshold for each point of interest; and an image signal converter configured to (1) make color correction of the color developers in received image data when the image data contains a portion where a total amount of the color developers exceeds a color developer maximum threshold, and (2) issue an instruction to apply the transparent toner to a portion where the total amount is not more than the transparent developer threshold.

According to the aspect described above, a highly glossy image can be obtained by appropriately adjusting the usage amount of the transparent toner.

BRIEF DESCRIPTION OF THE DRAWINGS

FIGS. 7A and 7B illustrate distribution diagrams of image signal values of images formed based on CMYK image signals before and after they are subjected to the toner total amount restriction, in which FIG. 7A illustrates distribution regions of image signal values of color toners before being subjected to the toner total amount restriction, and FIG. 7B illustrates distribution regions of image signal values of color toners after being subjected to the toner total amount restriction.

FIG. 8 is a table illustrating a relationship between the transparent toner amount threshold and the transparent image signal value in regions (A) to (D) illustrated in FIG. 7.

DETAILED DESCRIPTION OF EMBODIMENTS

Figure 1:
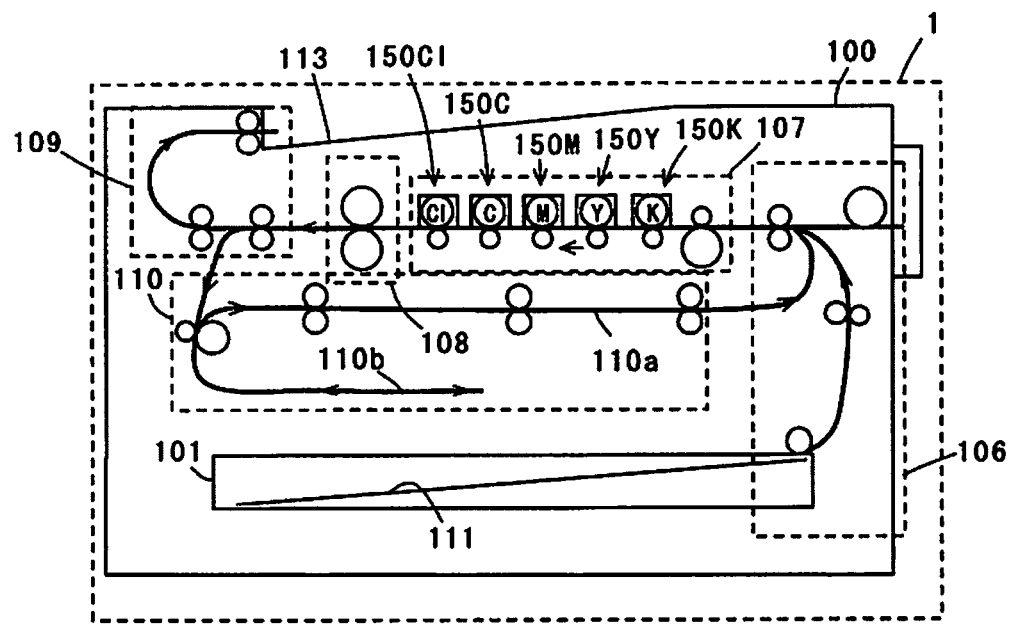
FIG. 1 is a schematic configuration diagram illustrating a configuration of key components of a printer as an image formation apparatus of Embodiment 1 according to the invention.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

Embodiment 1

FIG. 1 is a schematic diagram illustrating a configuration of key components of printer 1 as an image formation apparatus of Embodiment 1.

In FIG. 1, printer 1 has the configuration of an electronic photographic color printer, including printer engine 100, and controller 200 (see FIG. 3) and printer engine controller 250 (see FIG. 3) described later.

Printer engine 100 includes paper feed tray 101, paper feeder 106, image formation section 107, fixing unit 108, discharge unit 109, and double-sided printing unit 110. Paper feed tray 101 is provided with a predetermined amount of print sheets 111, and when printing, discharges print sheets on an upper side in a stacked direction thereof, one by one to print feeder 106. Discharged print sheet 111 is fed to image formation section 107 by paper feeder 106. In printer 1, an image based on image information sent to printer 1 as a job is printed on print sheet 111 conveyed to image formation section 107. Each arrow shown in the conveyance route (shown with heavy line) of print sheet 111 in FIG. 1 indicates the conveyance direction of the print sheet at the position of the arrow.

Image formation section 107 includes five image formation units 150K, 150Y, 150M, 150C, and 150Cl, each of which is configured to form a toner image in black (also simply referred to as K), yellow (also simply referred to as Y), magenta (also referred to as M), cyan (also referred to as C), and transparency or clear (also referred to as Cl), and which are arranged in that order from an insertion side toward a discharge side of print sheet 111. All of the five image formation units 150K, 150Y, 150M, 150C, and 150Cl are arranged in series and have the same configuration, forming a digital color printer of LED (Light Emitting Diode) type. The five image formation units are different from each other only in the kind of toner used, that is, K, Y, M, C, and Cl.

Here, image formation unit for black (K) 150K, image formation unit for yellow (Y) 150Y, image formation unit for magenta (M) 150M, image formation unit for cyan (C) 150C, and image formation unit for transparency (Cl) 150Cl are arranged in order from the upstream side in a paper conveyance direction. When there is no particular need for individual distinction, image formation units 150K, 150Y, 150M, 150C, and 150Cl are collectively referred to as toner image formation unit 150.

Figure 2:
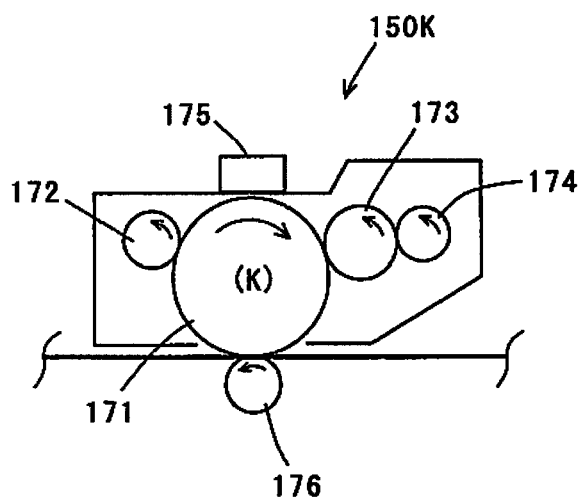
FIG. 2 is a partially enlarged view illustrating a schematic configuration of an image formation unit for the black (K) toner, and the circumference thereof.

Thus, to simplify the description, a schematic configuration of image formation unit for black (K) 150K only is described as a representative toner image formation unit. FIG. 2 is a partially enlarged view illustrating a schematic configuration of toner image formation unit 150K and the circumference thereof.

As illustrated in FIG. 2, image formation unit 150K includes photosensitive drum 171, charge roller 172, development roller 173, supply roller 174, LED head 175, and transfer roller 176. Arranged around photosensitive drum 171 in order from the upstream side in the rotating direction thereof (arrow direction in FIG. 2) are: charge roller 172 configured to evenly charge the surface of photosensitive drum 171; LED head 175 configured to form an electrostatic latent image by exposing the evenly charged surface of photosensitive drum 171 based on image information; development roller 173 configured to form a toner development by placing toners on the electrostatic latent image; and transfer roller 176 configured to transfer the toner development onto print sheet 111 conveyed in the conveyance route (shown with heavy line) by a conveyance belt (not shown).

Arranged in contact with development roller 173 is toner supply roller 174 configured to supply a toner (in this case, a black toner) supplied from a toner cartridge (not shown) by charging onto a surface of development roller 173. Each of image formation unit 150 is driven by an individual motor (not shown).

Print sheet 111 has toner images of Y, M, C and Cl sequentially and similarly superposed and transferred thereon in image formation section 107. Thereafter, print sheet 111 is conveyed to fixing unit 108. The reason for the arrangement in which the transfer of a transparent (Cl) toner image comes last is to enhance the glossy texture of the output image by superposing an image formed by a transparent toner as a transparent developer onto a color image formed by the color toners as color developers.

Fixing unit 108 includes a fixing roller and a pressing roller. For example, fixing unit 108 fixes, with heat generated by a heater or the like and pressure applied by the rollers, a toner image transferred onto print sheet 111 by print formation unit 107. Print sheet 111, on which the toner image is fixed, is discharged to stacker 113 by discharge unit 109.

Double-sided printer 110 is provided downstream of fixing unit 108 in the paper conveyance direction. In the double-sided print mode, double-sided printer 110 once pulls, into drawing-in part 110b, print sheet 111 fed from discharge part 109 by a guide unit (not shown). The guide unit thereafter guides print sheet 111 to conveyance route 110a by a reverse conveyance and feeds out to image former 107 again, with print sheet 111 carrying a toner image on one surface thereof. In this way, image formation section 107 can transfer the toner image onto the other surface of print sheet 111 where the other toner image is fixed, whereby double-sided printing becomes possible.

Figure 3:
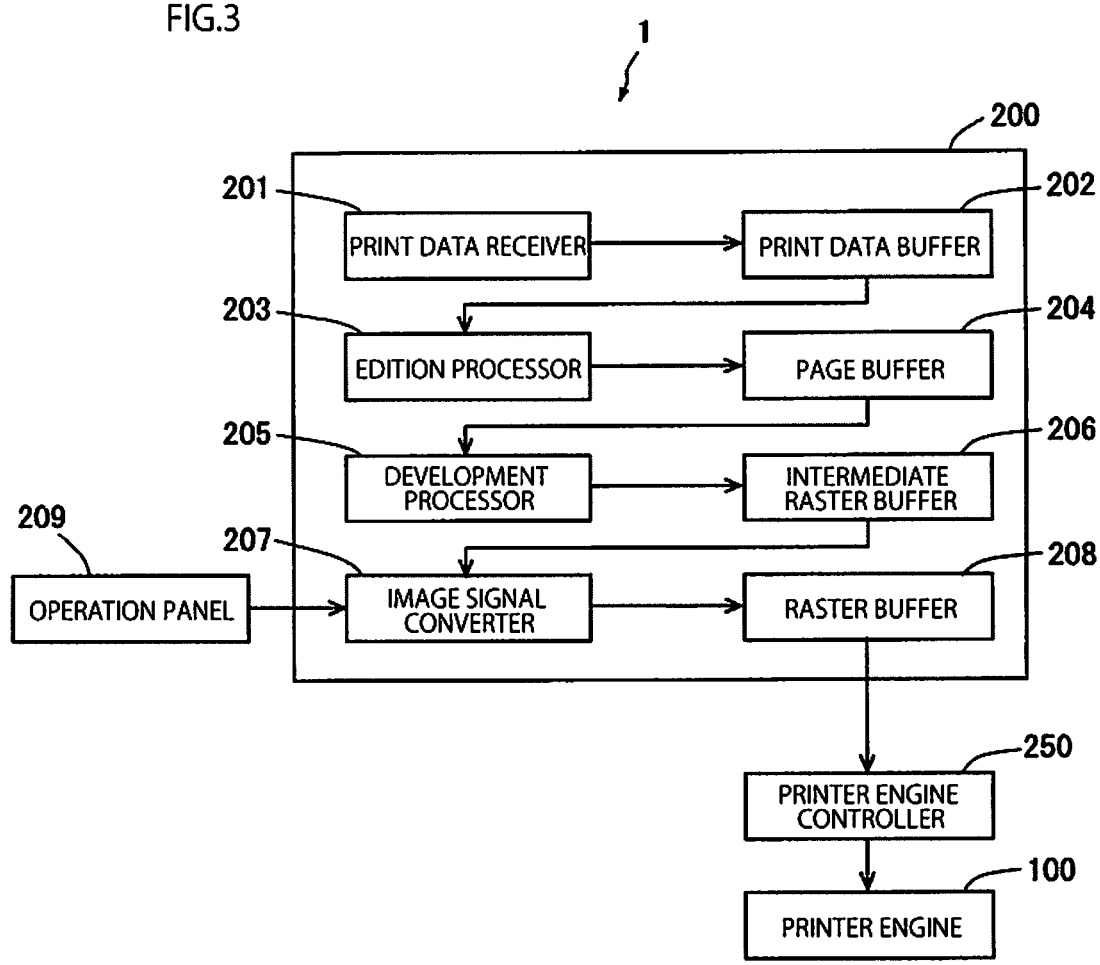
FIG. 3 is a block diagram illustrating a configuration of a controller configured to control operations of key components of the printer of Embodiment 1.

FIG. 3 is a block diagram illustrating a configuration of controller 200 configured to control operations of key components.

In FIG. 3, print data receiver 201 is an interface such as a network, a USB and the like, configured to receive print data from outside of the printer. Print data buffer 202 is a buffer configured to temporarily store print data received by print data receiver 201.

Edition processor 203 is configured to read print data from print data buffer 202, perform command analysis and creation of drawing data per page, and store results of the command analysis in page buffer 204 after converting the results to DisplayCode. Here, an image signal contained in the print data is a RGB image signal or a CMYK image signal, and respective colors are represented with an 8-bit value per pixel.

Development processor 205 is configured to read the DisplayCode corresponding to one page from page buffer 204, and to store print details of the entire page in intermediate raster buffer 206 after converting them to a raster image. Image signal converter 207 is configured to read a raster image corresponding to one page from intermediate raster buffer 206, convert the 8-bit image signal values of respective colors of the RGB image signal or the CMYK image signal to 1-bit image signal values of C, M, Y, K and Cl colors printable with printer engine 100, and store the converted raster image in raster buffer 208.

Operation panel 209 is configured to display the status of printer 1 and a message to the user, and accept an input to printer 1 from the user. Printer engine controller 250 is configured to read the raster image corresponding to one page from raster buffer 208, and activate printer engine 100 to print the received raster image.

Figure 4:
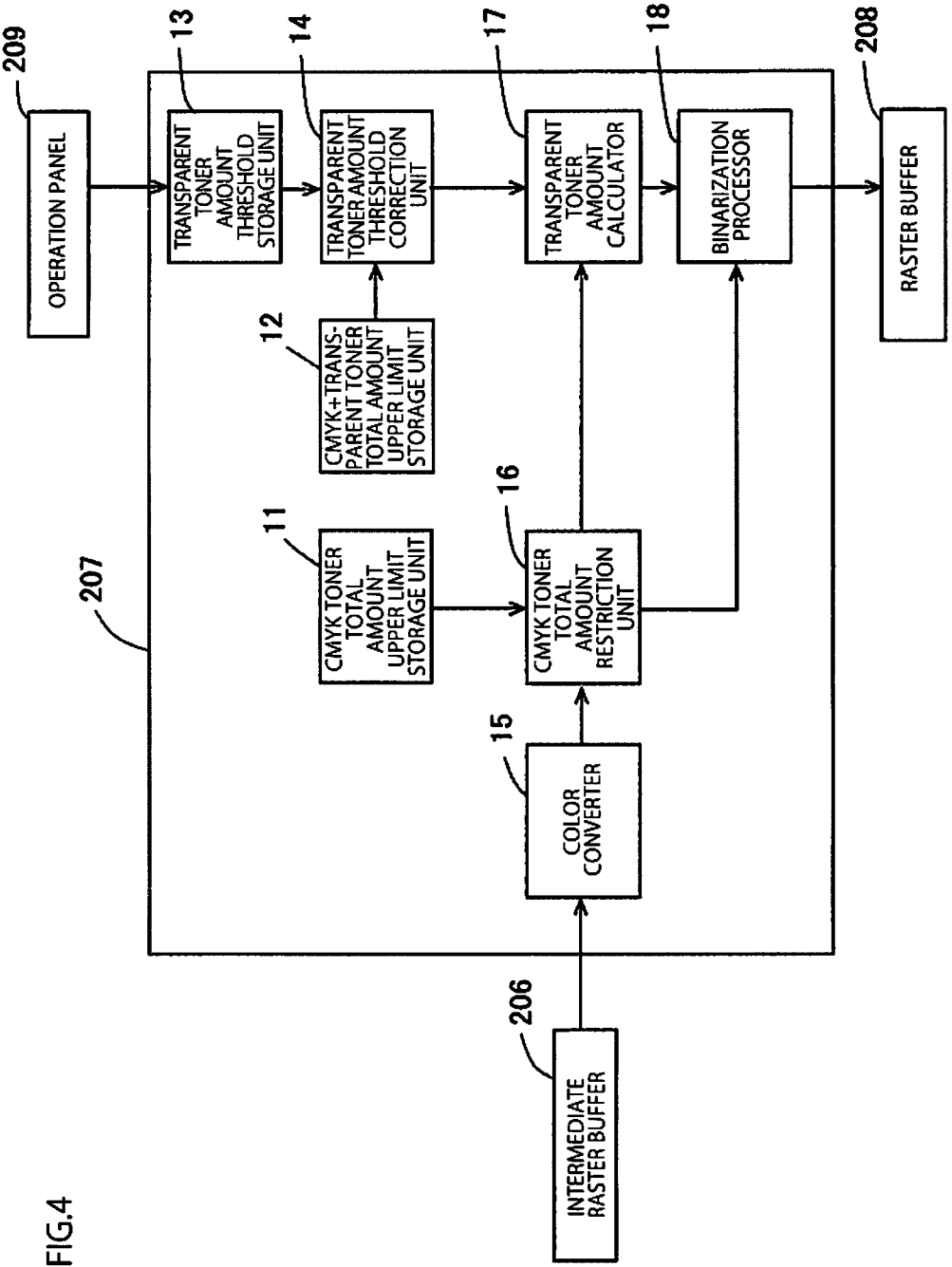
FIG. 4 is a detailed block diagram of an image signal converter of the printer of Embodiment 1.

FIG. 4 is a detailed block diagram of image signal converter 207. The configuration of image signal converter 207 is further described with reference to FIG. 4.

The toner amount may be expressed as 0% (0), 100% (255), 200% (510), 240% (612), 280% (714), or the like in correspondence to the case where a possible 0 to 255 of 8-bit image signal values of respective colors is converted to 0% to 100%.

In FIG. 4, CMYK+transparent toner total amount upper limit storage unit 12 is configured to store a total amount upper limit value of C, M, Y, K and Cl toners that can be layered together per pixel. The total amount upper limit value is predetermined for the printer. Here, the total amount upper limit value is set to 280%. CMYK toner total amount upper limit storage unit 11 is configured to store the total amount upper limit value (per pixel) of C, M, Y, and K toners, and to store the total amount upper limit value as determined by considering the total amount upper limit of the C, M, Y, K and Cl toners. Here, the total amount upper limit value is set to 240%. CMYK toner total amount upper limit storage unit 11 corresponds to a color developer threshold memory unit.

Transparent toner amount threshold storage unit 13 is configured to store a value used to calculate the amount of transparent toner layered over a color toner image received from the outside via operation panel 209. Here, the effective range of that value is in a range of from 0% to 280% that is the total amount upper limit value (per pixel) of C, M, Y, K and Cl toners.

Transparent toner amount threshold correction unit 14 is configured to determine, based on the toner total amount upper limit value stored in CMYK+transparent toner total amount upper limit storage unit 12, and the effectiveness of the transparent toner amount threshold stored in transparent toner amount threshold storage unit 13, and to correct a threshold exceeding the effective range, if any, to a value within the effective range. For example, a threshold of 0% or below is corrected to 0%, threshold of 280% or above is corrected to 280%, and the threshold thus corrected is held. Operation panel 209, CMYK+transparent toner total amount upper limit storage unit 12, transparent toner amount threshold storage unit 13, and transparent toner amount threshold correction unit 14 all correspond to a threshold setting unit. Transparent toner amount threshold correction unit 14 also corresponds to a transparent developer threshold memory unit.

Color conversion processing unit 15 is configured to convert a received image signal value to an 8-bit image signal value of C, M, Y, and K colors of subtractive color mixing that can be developed by printer engine 100. Specifically, the image signal value is converted using a look-up table associated by considering, in advance, a difference of the coloring properties between the RGB image signal and the CMYK image signal. When the received image signal value represents the CMYK image signal, the received 8-bit image signal value of C, M, Y, and K colors per pixel is outputted as it is without color conversion processing.

CMYK toner total amount restriction unit 16 as a developer total amount restriction unit is configured to restrict the total amount of CMYK toners in such a manner that image signal values of CMYK image signals sequentially received from color converter 15 do not exceed the total amount upper limit values of the C, M, Y, and K toners held in CMYK toner total amount upper limit storage unit 11.

Specifically, a CMYK toner total amount is restricted by the formulas given below, where: Ca, Ma, Ya and Ka respectively represent 8-bit image signal values as color pixel values of C, M, Y, and K colors per pixel received from color converter 15; Sum(Ca, Ma, Ya, Ka) represents the toner total amount as a first total value being the sum of the image signal values; SumMax represents the toner total amount upper limit value as a first threshold; and Cb, Mb, Yb, and Kb respectively represent image signal values as restricted color pixel values of C, M, Y, and K colors after being subjected to the toner total amount restriction.

When Sum(Ca, Ma, Ya, Ka)>SumMax, $$Cb=Ca+(\text{SumMax}-\text{Sum}(Ca,Ma,Ya,Ka))/4$$

$$Mb=Ma+(\text{SumMax}-\text{Sum}(Ca,Ma,Ya,Ka))/4$$

$$Yb=Ya+(\text{SumMax}-\text{Sum}(Ca,Ma,Ya,Ka))/4$$

$$Kb=Ka+(\text{SumMax}-\text{Sum}(Ca,Ma,Ya,Ka))/4 \qquad (1)$$

When Sum(Ca, Ma, Ya, Ka)≤SumMax, $$Cb=Ca$$

$$Mb=Ma$$

$$Yb=Ya$$

$$Kb=Ka \qquad (2)$$

However, the CMYK toner total amount restriction processing is not limited to the above formulas. A processing using a different method so far proposed may be applied.

Transparent toner amount calculator 17 as a transparent developer amount calculator is configured to calculate the transparent image signal value as a transparent pixel value of the transparent image signal associated with the transparent toner amount. This calculation is based on the transparent toner amount threshold as a second threshold held in transparent toner amount threshold correction unit 14, with respect to a CMYK image signal after being subjected to the CMYK toner total amount restriction. The CMYK image signal is received sequentially from CMYK toner total amount restriction unit 16.

Specifically, the transparent image signal value of the transparent image signal is calculated by the formula given below, where Cb, Mb, Yb, and Kb respectively represent the image signal value of the C, M, Y and K colors after being subjected to the toner total amount restriction through CMYK toner total amount restriction unit 16. Sum(Cb, Mb, Yb, Kb) represents the toner total amount as a second total value of the sum thereof. THcl represents the transparent toner amount threshold value held by transparent toner amount threshold correction unit 14, and Clb represents the calculated transparent image signal value.

$$Clb=THcl-\text{Sum}(Cb,Mb,Yb,Kb) \qquad (3)$$

where the following range conditions are given:

$Clb=0\%$ when $Clb<0\%$, and $Clb=100\%$ when $Clb>100\%$.

Binarization processor 18 is configured to sequentially receive 8-bit image signal values of C, M, Y, and K colors after being subjected to the toner total amount restriction from CMYK toner total amount restriction unit 16, and 8-bit transparent image signal values corresponding thereto from transparent toner amount calculator 17. Binarization processor 18 then converts those signals to 1-bit image signal values of C, M, Y, and K colors, and Cl printable with the printer engine. Here, conversion from 8 bits to 1 bit is performed using the known dither method.

CMYK toner total amount restriction unit 16 and transparent toner amount calculator 17 correspond to an image signal converter. Accordingly, the image signal converter makes a color correction of color developers in received image data when the image data contains a portion where the toner total amount exceeds the toner total amount upper limit value (color developer maximum threshold). The image signal converter then issues an instruction to apply the transparent toner to a portion of the image data where the toner total amount is not more than the transparent toner amount threshold (transparent developer threshold).

In the above configuration, the operation of printer 1 according to Embodiment 1 is described with reference to the flow charts illustrated in FIGS. 5 and 6. First, the general operation of printer 1 is described based on the flow chart illustrated in FIG. 5 and with reference to FIGS. 3 and 4.

Printer 1 receives in advance a transparent toner amount threshold from the outside via operation panel 209, and stores it in transparent toner amount threshold storage unit 13 (step S101). Next, upon receiving print data from the outside, print data receiver 201 temporarily stores the received print data in print data buffer 202 (step S102). Edition processor 203 reads the print data from print data buffer 202, performs command analysis and the creation of drawing data per page, and stores the results of the command analysis in page buffer 204 after converting them to DisplayCode (step S103).

Development processor 205 reads the DisplayCode corresponding to one page from page buffer 204, and stores print details of the entire page in intermediate raster buffer 206 after converting the page to a raster image (step S104). Image signal converter 207 performs image signal conversion processing, described later (step S105). Printer engine controller 250 reads the raster image corresponding to one page from raster buffer 208, and activates printer engine 100 to print the received raster image (step S106).

Figure 6:
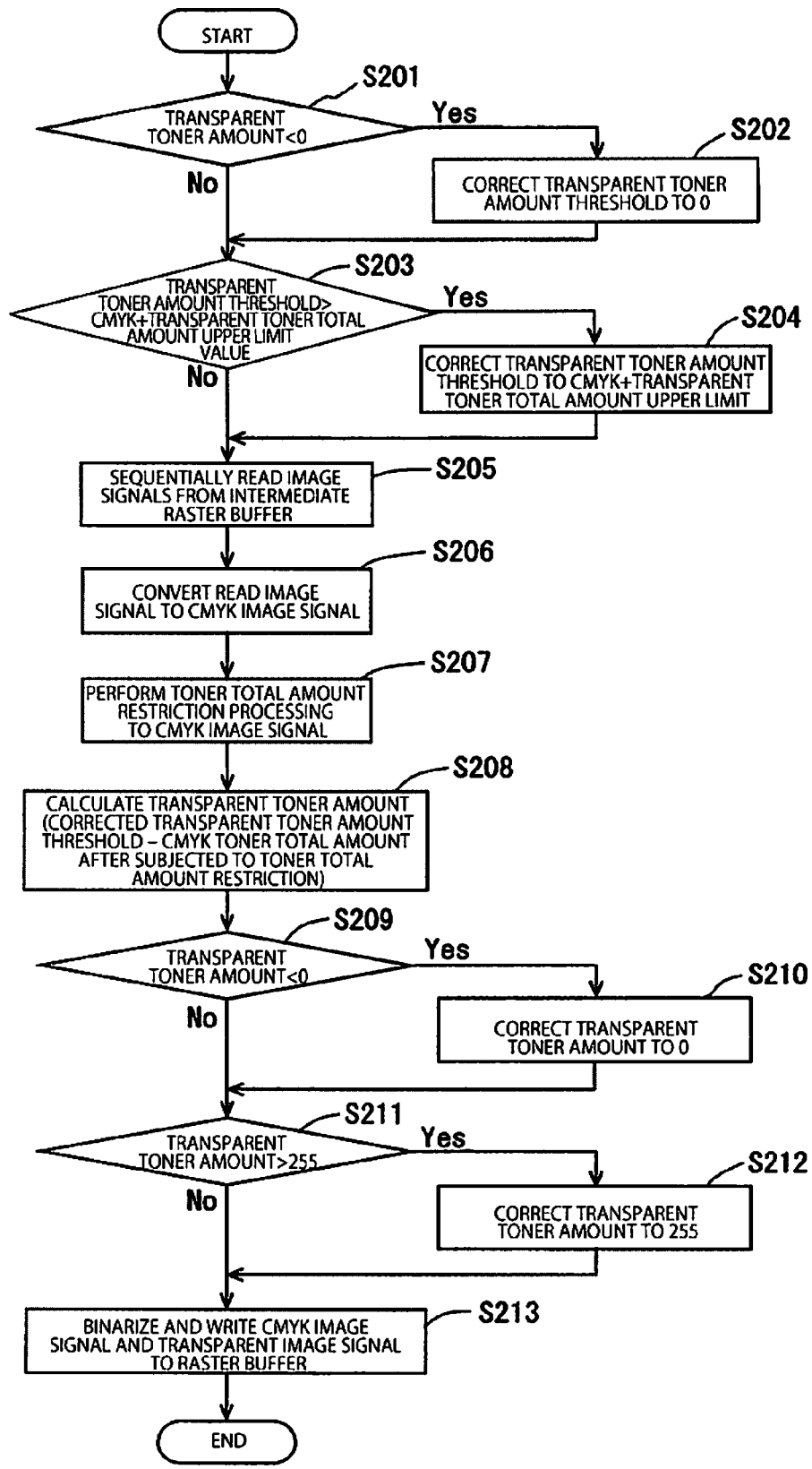
FIG. 6 is a flow chart for illustrating a detailed flow of an image signal conversion processing in the printer of Embodiment 1.

Next, a detailed flow of the image signal conversion processing by image signal converter 207 in the performed above step S105 is described based on the flow chart illustrated in FIG. 6 and with reference to FIG. 4.

Transparent toner amount threshold correction unit 14 receives the transparent toner amount threshold stored in transparent toner amount threshold storage unit 13, corrects the transparent toner amount threshold to 0 (step S202) when the transparent toner amount threshold is less than 0 (step S201: yes), or on the other hand, corrects the transparent toner amount threshold to the CMYK+transparent toner total amount upper limit value (step S204) when the transparent toner amount threshold is greater than the upper limit value stored in CMYK+transparent toner total amount upper limit storage unit 12 (step S203: Yes). Otherwise ((step S201: No) and (step S203: No)), no corrections are performed.

Next, RGB image signal or CMYK image signal corresponding to one page is sequentially received per pixel from intermediate raster buffer 206 (step S205), and the processing in subsequent steps S206 to S212 is repeated until there is no image signal to read.

In the course of the processing, color converter 15 converts the received RGB image signal to the CMYK image signal. When the CMYK image signal is received, color converter 15 outputs the received CMYK image signal as it is without performing the conversion processing (step S206). Next, CMYK toner total amount restriction unit 16 performs toner total amount restriction processing by executing, with respect to an image signal value of the received CMYK image signal, the above-described Formula (1) or Formula (2) according to a CMYK toner total amount upper limit value stored in CMYK toner total amount upper limit storage unit 11 (step S207).

Next, transparent toner amount calculator 17 calculates, with respect to a CMYK image signal after being subjected to the CMYK toner total amount restriction, the transparent image signal value of a transparent image signal associated with the transparent toner amount based on a transparent toner amount threshold held in transparent toner amount threshold correction unit 14, with the CMYK image signal being received sequentially from CMYK toner total amount restriction unit 16. Specifically, the transparent image signal value (transparent toner amount) is calculated by Formula (3) described above (step S208). Thereafter, when the calculated transparent image signal value is less than 0 (0%) (step S209: Yes), the transparent toner amount is corrected to 0 (step S210). When the transparent image signal value is greater than 255 (100%) (step S211: Yes), the transparent toner amount is corrected to 255 (step S212). Otherwise ((step S209: No) and (step S211: No)), no corrections are performed.

Here, a relationship between image signal values Cb, Mb, Yb, and Kb of the CMYK image signal, after being subjected to the CMYK toner total amount restriction, and the transparent image signal value Clb of the transparent image signal calculated from the transparent toner amount threshold is described with reference to FIGS. 7A, 7B and 8. FIGS. 7A and 7B are distribution diagrams of image signal values of images formed based on CMYK image signals before and after being subjected to the toner total amount restriction. FIG. 7A illustrates a distribution region of image signal values of color toners before being subjected to the toner total amount restriction. FIG. 7B illustrates a distribution region of image signal values of color toners after being subjected to the toner total amount restriction. FIG. 8 is a table illustrating a relationship between the transparent toner amount threshold and the transparent image signal value in regions (A) to (D).

Specifically, cases where the transparent toner amount threshold is set to 0% (0), 100% (255), 200% (510), 240% (612), and 280% (714) are described.

FIG. 7A illustrates an example of a received image signal before being subjected to the total amount restriction, where image signal value (Ca, Ma, Ya, Ka)=(0, 0, 0, 0) is specified in Region (A), (Ca, Ma, Ya, Ka)=(255, 0, 0, 0) in Region (B), (Ca, Ma, Ya, Ka)=(255, 255, 0, 0) in Region (C), and (Ca, Ma, Ya, Ka)=(255, 255, 255, 255) in Region (D).

FIG. 7B illustrates an example of an image signal after being subjected to the CMYK toner total amount restriction, with the CMYK toner total amount upper limit value as 612 (240%) with respect to a revised image signal, and where image signal value (Cb, Mb, Yb, Kb)=(0, 0, 0, 0) is specified in Region (A), (Cb, Mb, Yb, Kb)=(255, 0, 0, 0) in Region (B), (Cb, Mb, Yb, Kb)=(255, 255, 0, 0) in Region (C), and (Cb, Mb, Yb, Kb)=(153, 153, 153, 153) in Region (D). Here, in Region (D), the CMYK toner total amount becomes 1020, not lower than the CMYK toner total amount upper limit value (612). Therefore, the CMYK image signal value is changed through the CMYK toner total amount restriction processing by Formula (1) described above.

Next, a relationship between the transparent toner amount threshold and the transparent image signal value Clb (transparent toner amount), calculated with respect to the above regions (A), (B), (C), and (D) where image signal values Cb, Mb, Yb, and Kb have been fixed after being subjected to the toner total amount restriction, is described with reference to FIG. 8.

When the transparent toner amount threshold is 0 (0%), the transparent image signal value Clb (transparent toner amount) calculated by the above Formula (3) and set in steps S208 to S212 becomes 0 in any regions of (A), (B), (C), and (D). Consequently, the transparent image is not formed.

When the transparent toner amount threshold is 255 (100%), the transparent image signal value Clb (transparent toner amount) calculated by the above Formula (3) and set in steps S208 to S212 is 255 in Region (A), and is 0 in any other regions in each of which a calculated value is not more than 0. That is, the transparent image with 100% output is formed only in Region (A).

When the transparent toner amount threshold is 510 (200%), the transparent image signal value Clb (transparent toner amount) calculated by the above Formula (3) and set in steps S208 to S212 is 255 in Regions (A) and (B) in each of which a calculated value is not less than 255, and is 0 in Regions (C) and (D) in each of which a calculated value is not more than 0. That is, the transparent image with 100% output is formed only in Regions (A) and (B).

When the transparent toner amount threshold is 612 (240%), the transparent image signal value Clb (transparent toner amount) calculated by the above Formula (3) and set in steps S208 to S212 is 255 in Regions (A) and (B) in each of which a calculated value is not less than 255, is 102 in Region (C) where a calculated value is 102, and is 0 in Region (D) where a calculated value is 0. That is, the transparent image is formed in Regions (A), (B), and (C); more specifically, the transparent image with 100% output is formed in Regions (A) and (B), and the transparent image with halftone output is formed in Region (C).

When the transparent toner amount threshold is 714 (280%), the transparent image signal value Clb (transparent toner amount) calculated by the above Formula (3) and set in steps S208 to S212 is 255 in Regions (A) and (B) in each of which a calculated value is not less than 255, is 204 in Region (C) where a calculated value is 204, and is 102 in Region (D) where a calculated value is 102. That is, the transparent image is formed in all regions of (A), (B), (C), and (D); more specifically, the transparent image with 100% output is formed in Regions (A) and (B), and the transparent image with halftone output is formed in Regions (C) and (D).

In such a way, the transparent image can be formed in a limited region by setting the transparent toner amount threshold.

Binarization processor 18 receives 8-bit image signal values Cb, Mb, Yb, and Kb after being subjected to the toner total amount restriction through CMYK toner total amount restriction unit 16. An 8-bit transparent image signal value Clb (transparent toner amount) from transparent toner amount calculator 17 is converted to 1-bit image signal values of CMYK colors and is transparency printable with printer engine 100, and is written into raster buffer 208 (step S213) to complete the image signal conversion processing.

That is, printer 1 is configured to receive, from the outside, a transparent toner amount threshold independent of the toner total amount restriction of the printer, and to calculate a transparent image signal value corresponding to the transparent toner amount based on a difference between the toner total amount of image signal values of the CMYK image signals with respect to respective pixels of color toner images and image signal value, and the transparent toner amount threshold. With such a configuration, for example, by setting a value corresponding to a highlight portion of the image to the transparent toner amount threshold, it is possible to form an image having a transparent toner applied to a highlight portion where glossy texture is unlikely to be achieved with color toners only, and is not applied to medium and high concentration portions where minimum glossy texture is available with color toners only.

Accordingly, as described above, printer 1 according to this aspect, can suppress a consumption of the transparent toner without impairing the glossy texture of the image. Further, an image of higher glossy texture can be obtained by setting a value corresponding to medium and high concentration portions of the image to the transparent toner amount threshold, although toner consumption increases.

In contrast, conventional image formation apparatuses (for example, see Japanese Patent Application Laid-Open No. 2010-152209) have the following problems. For printing a document in which a highlight region including a non-printing region, and intermediate and high concentration regions co-exist, the above printing mode (1) not applying a transparent toner or the above printing mode (3) printing in two passes may be selected depending on the conditions for judging the histogram. When the printing mode (1) is selected, the transparent toner is not applied to the highlight region where support by the transparent toner is most needed to produce glossy texture. Especially, when highly glossy CMYK color toners are used, application of the transparent toner is needed only to the highlight region since a certain level of glossy texture can be obtained in intermediate and high concentration regions without application of the transparent toner. On the other hand, when the printing mode (3) is selected, a complicated operation is forced, and a redundant transparent toner may be consumed when printing in the second pass. Since the transparent toner is usually more expensive than normal CMYK color toners, consumption of the transparent toner is preferably reduced to a minimum requirement.

Embodiment 2

Figure 9:
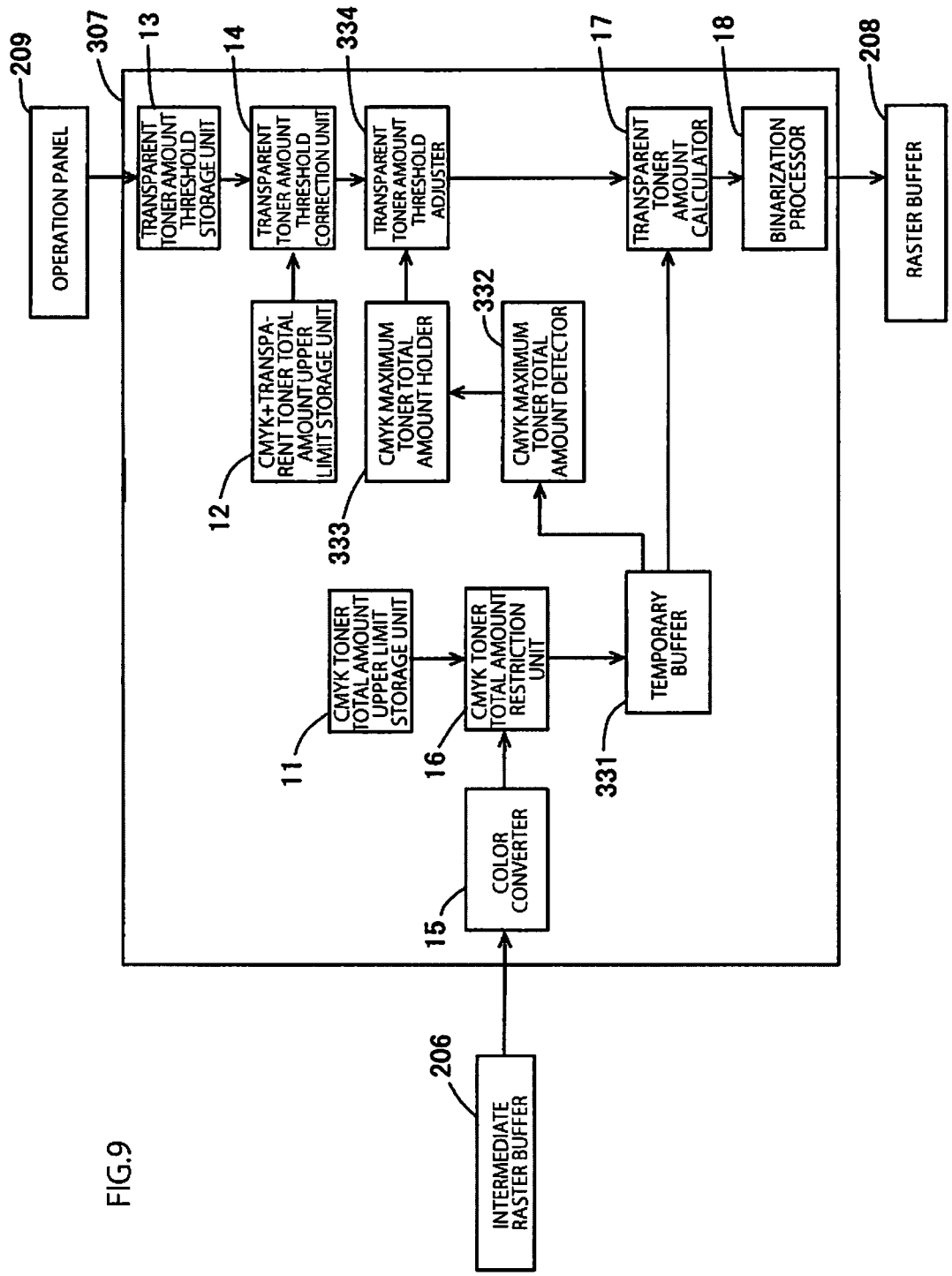
FIG. 9 is a detailed block diagram of an image signal converter of a printer of Embodiment 2.

FIG. 9 is a detailed block diagram of image signal converter 307 employed in a printer of Embodiment 2. A printer using image signal converter 307 is different from a printer using image signal converter 207 of Embodiment 1 illustrated in FIG. 4 mainly in that temporary buffer 331, CMYK maximum toner total amount detector 332, CMYK maximum toner total amount holder 333, and transparent toner amount threshold adjuster 334 are added to image signal converter 307, and operations of CMYK toner total amount restriction unit 16 and transparent toner amount calculator 17 are partially different due to those additions.

Accordingly, units common to the printer using image signal converter 307 and printer 1 of above Embodiment 1 (FIGS. 1 and 3) are assigned with the same reference numerals, and descriptions and drawings thereof are omitted. Thus, the description here is focused on the differences therebetween. Since the configuration of key components of the printer according to this embodiment, except image signal converter 307, is common to the configuration of key components of printer 1 according to Embodiment 1 illustrated in FIGS. 1 and 3, FIGS. 1 and 3 are referred to, if necessary.

In FIG. 9, temporary buffer 331 is a buffer configured to temporarily hold image signal values of CMYK image signals for one page after being subjected to the CMYK toner total amount restriction through CMYK toner total amount restriction unit 16. CMYK maximum toner total amount detector 332 is configured to sequentially read the image signal values held in temporary buffer 331, and to detect the maximum toner total value from the toner total values of the image signal values. CMYK maximum toner total amount holder 333 is configured to hold a CMYK maximum toner total amount, being the maximum total value detected by CMYK maximum toner total amount detector 332. Temporary buffer 331, CMYK maximum toner total amount detector 332, and CMYK maximum toner total amount holder 333 correspond to a maximum total value detection holder.

Transparent toner amount threshold adjuster 334 is configured to adjust the transparent toner threshold held in transparent toner amount threshold correction unit 14 based on the CMYK maximum toner total amount detected by CMYK maximum toner total amount detector 332, as described later.

In the above configuration, the operation of a printer according to Embodiment 2 is described with reference to the flow charts illustrated in FIGS. 5, 10 and 11. However, in the flowchart of FIG. 5, a description of the operations other than the image signal conversion processing in step S105 is omitted since the operations are the same as those described in connection with Embodiment 1 described above.

Figure 5:
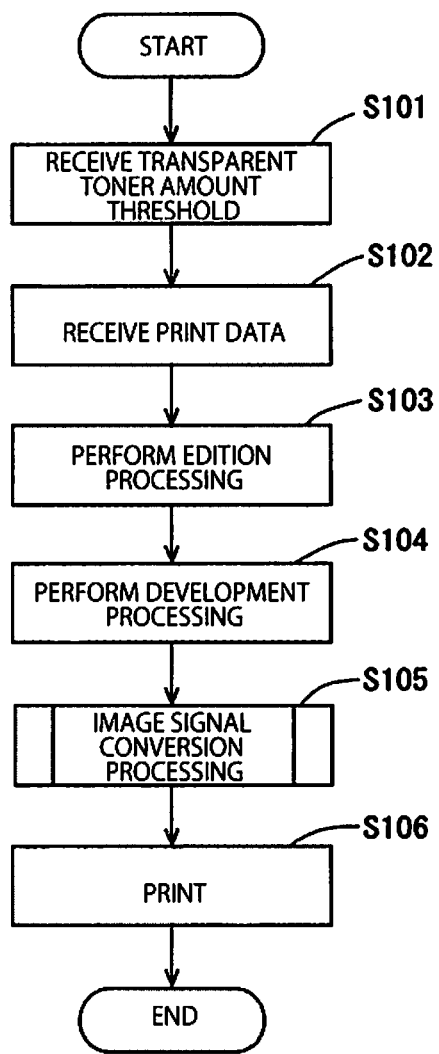
FIG. 5 is a flow chart for illustrating the general operations of the printer of Embodiment 1.
Figure 10:
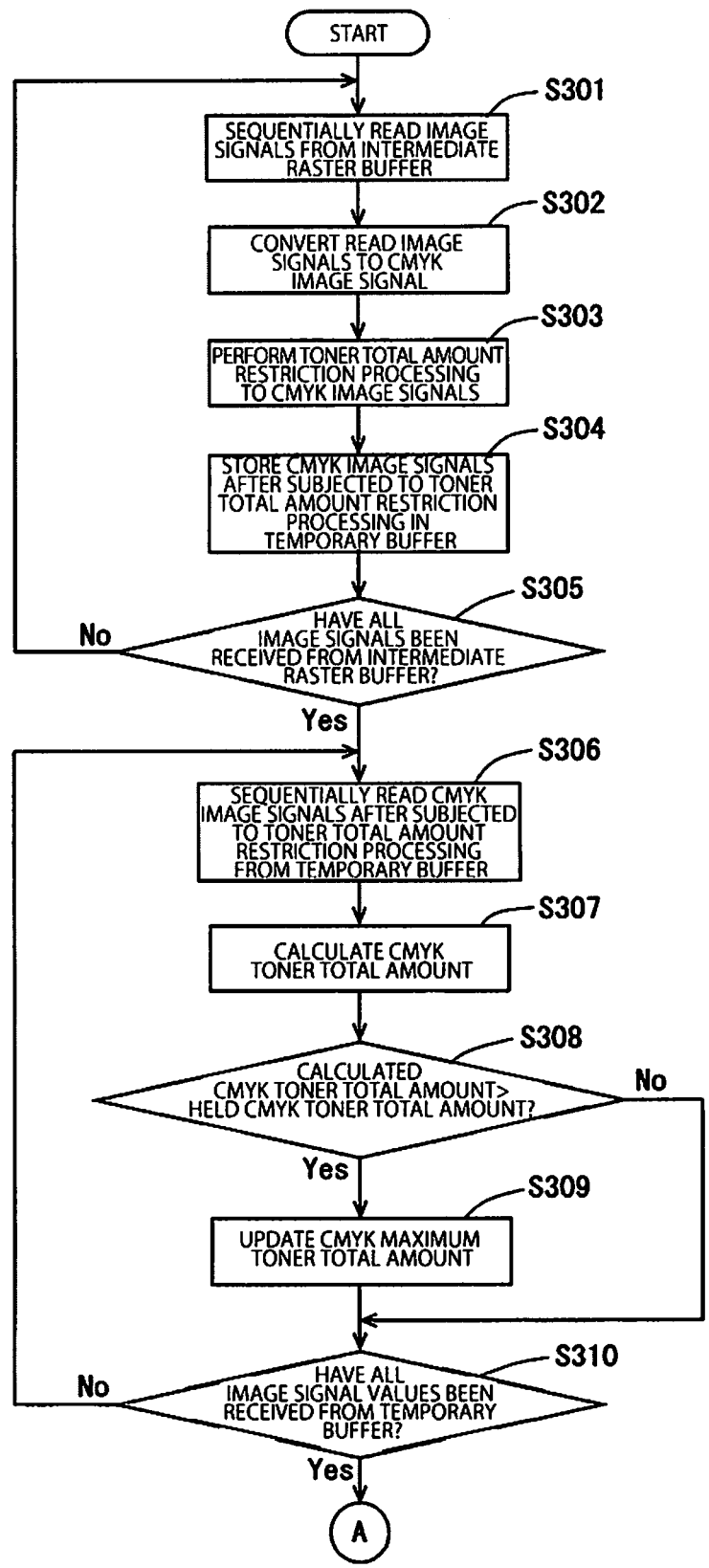
FIG. 10 is a flow chart for illustrating a detailed flow of an image signal conversion processing in the printer of Embodiment 2.
Figure 11:
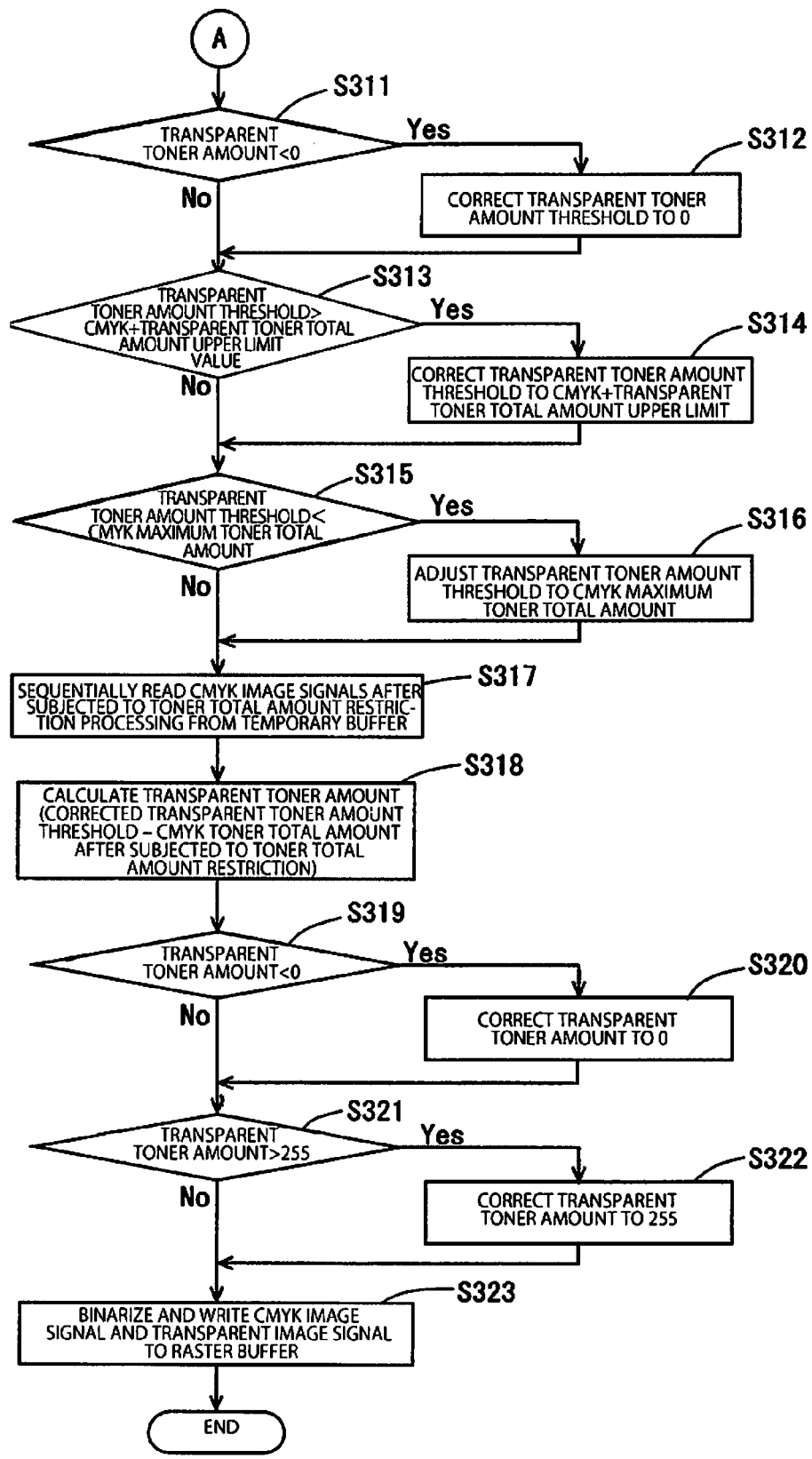
FIG. 11 is a flow chart for illustrating a detailed flow of the image signal conversion processing of the printer of Embodiment 2.

Flow charts illustrated in FIGS. 10 and 11 show detailed flows of the image signal conversion processing performed by image signal converter 307 in step S105 of the flow chart in FIG. 5. Based on the flow chart, details of the processing is described with reference to FIG. 9. In FIGS. 10 and 11, the same circled reference numerals indicate that both flow charts are connected to each other.

RGB image signals or CMYK image signals corresponding to one page are sequentially received per pixel from intermediate raster buffer 206 (step S301), and the processing in subsequent steps S302 to S305 is repeated until there is no image signal to read.

In the course of the processing, color converter 15 converts the received RGB image signal to the CMYK image signal. If the CMYK image signal is received, color converter 15 outputs the received CMYK image signal, as it is without performing the conversion processing (step S302). Next, CMYK toner total amount restriction unit 16 performs the toner total amount restriction processing by executing, with respect to the image signal value of the received CMYK image signal, the above Formula (1) or Formula (2) according to a CMYK toner total amount upper limit value stored in CMYK toner total amount upper limit storage unit 11 (Step S303), and stores the image signal value of the CMYK image signal, after being subjected to the toner total amount restriction processing into temporary buffer 331 (step S304). In the same manner, the above processing is repeated until all image signals are read from intermediate raster buffer 206 (step S305: No).

Upon reading all image signals from intermediate raster buffer 206 (step S305: Yes), CMYK maximum toner total amount detector 332 sequentially receives CMYK image signals after being subjected to the toner total amount restriction processing from temporary buffer 331 (step S306), and executes subsequent steps S307 to S310 until there is no image signal to read.

In the course of this processing, CMYK maximum toner total amount detector 332 calculates a toner total amount representing the sum of received image signal values after being subjected to the toner total amount restriction processing (step S307). When the toner total amount is more than the maximum toner total amount held in CMYK maximum toner total amount holder 333 (step S308: Yes), CMYK maximum toner total amount holder 333 holds the toner total amount calculated in step S307 as a maximum toner total amount (step S309). Thereafter, CMYK maximum toner total amount detector 332 repeats the above processing until all image signals are read from temporary buffer 331 (step S310: No). Upon completion of the processing to all image signals (step S310: Yes), CMYK maximum toner total amount detector 332 performs the processing of step S311 and subsequent steps. Accordingly, at this stage, CMYK maximum toner total amount holder 333 holds the biggest CMYK toner total amount among the image signal values stored in temporary buffer 331.

Transparent toner amount threshold correction unit 14 receives a transparent toner amount threshold stored in transparent toner amount threshold storage unit 13, corrects the transparent toner amount threshold to 0 (step S312) when the transparent toner amount threshold is less than 0 (step S311: yes), or, on the other hand, corrects the transparent toner amount threshold to the CMYK+transparent toner total amount upper limit value (step S314) when the transparent toner amount threshold is greater than the upper limit value stored in CMYK+transparent toner total amount upper limit storage unit 12 (step S313: Yes). Otherwise ((step S311: No) and (step S313: No)), no corrections are performed.

Next, transparent toner amount threshold adjuster 334 compares a transparent toner amount threshold held in transparent toner amount threshold correction unit 14 and a CMYK maximum toner total amount held in CMYK maximum toner total amount holder 333 with each other (step S315), and changes the transparent toner amount threshold to a value of the CMYK maximum toner total amount (step S316) when the CMYK maximum toner total amount is greater (step S315: Yes). That is, transparent toner amount threshold adjuster 334 as a threshold adjuster compares the CMYK maximum toner total amount as a maximum total value and the transparent toner amount threshold as a second threshold with each other, and outputs the greater value as a third threshold.

Next, transparent toner amount threshold adjuster 334 sequentially receives, from temporary buffer 331, image signal values of CMYK image signals after being subjected to the toner total amount restriction processing, and repeats the processing of subsequent steps S318 to S323 until there is no image signal to read. Here, a description of steps S318 to S323 is omitted, since those steps are transparent toner setting and binarization processing, the steps being quite the same as steps S208 to S213 of the flow chart illustrated in FIG. 6 and operate as described in connection with above Embodiment 1.

In summary, the printer according to this embodiment is configured to receive, from the outside, a threshold independent of the toner total amount restriction of the printer, to detect a maximum value of the sum (CMYK toner total amount) of image signal values of CMYK image signals in color toner images after being subjected to the toner total amount restriction processing, and to use the maximum value as a transparent toner threshold when the maximum value is greater than the threshold received from the outside, and to use, as the transparent toner threshold, the threshold received from the outside as it is, when the maximum value is smaller than the threshold.

Next, the difference is described with reference to FIGS. 7A and 7B between a transparent image formed through the transparent toner amount threshold change (step S316) by transparent toner amount threshold adjuster 334 and a transparent image formed through processing according to above Embodiment 1 without the threshold change.

When an image signal is received before being subjected to the CMYK toner total amount restriction processing illustrated in FIG. 7A, the image signal is converted to an image signal after being subjected to the CMYK toner total amount restriction processing illustrated in FIG. 7B through the toner total amount restriction processing. Here, the CMYK toner total amount upper limit value is 612 (240%).

Thereafter, the image signal, after being subjected to the CMYK toner total amount restriction (upper limit value: 240%) illustrated in FIG. 7B, is sent to CMYK maximum toner total amount detector 332, and CMYK maximum toner total amount holder 333 holds a value of 240% (612=153×4) of Region (D), a maximum toner total amount. For this reason, when a transparent toner amount threshold received from the outside is not more than 240%, the transparent toner amount threshold is adjusted to 240%.

That is, for example, when a user sets the transparent toner amount threshold to 100% with respect to the image signal illustrated in FIG. 7, a transparent image is formed in Region (A) only in the processing of above Embodiment 1. Differently, according to the processing of this embodiment, a transparent image is formed in Regions (A), (B), and (C), depending on the CMYK maximum toner total amount of image signals, except for the maximum concentration region (D) where maximum gloss is expected.

In the above embodiments, an example of externally specifying the transparent toner amount threshold from the outside through the operation panel is described. However, the invention is not limited thereto, and various modifications are available such as, for example, a configuration where a button for specifying the transparent toner amount threshold may be provided on the printer driver for setting the screen so as to notify the setting to the printer by being including in the print data.

As described above, the printers according to the embodiments are capable of forming an optimum transparent image according to the CMYK image even when a user setting of the transparent toner amount threshold is insufficient with respect to the concentration distribution of the CMYK image. Consequently, the formation of an image having an optimum transparent toner amount according to the concentration distribution of a color toner image is possible while ensuring a glossy texture desired by the user.

INDUSTRIAL APPLICABILITY

In the above embodiments, the present invention is described by exemplifying an electronic photographic color printer. However, the invention is not limited thereto, and may be applicable to image formation apparatuses such as printers other than those of the electronic photographic type, a complex machine or a copy machine that forms an image by receiving scanned image data instead of print data, and the like, provided that such apparatuses include a mechanism for forming an image by receiving print data from the outside. Further, since the invention involves a controller of the image formation apparatus, the invention is also applicable to a printer server not directly including a mechanism for forming an image.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. An image formation apparatus for forming an image using color developers and a transparent developer, the image formation apparatus comprising:
  a developer total amount restriction unit configured to calculate, for each pixel of an image to be formed by the color developers, a first total value representing a total value of received color pixel values, and output restricted color pixel values obtained by
    correcting the received color pixel values in such a manner that the first total value is reduced to a predetermined first threshold or below when the first total value exceeds a predetermined first threshold, or
    without correcting the received color pixel values when the first total value does not exceed the predetermined first threshold;
  a threshold setting unit configured to set a second threshold based on data received from outside the image formation apparatus; and
  a transparent developer amount calculator configured to calculate a second total value representing a total value of the restricted color pixel values for each pixel, a difference between the second threshold and the second total value, and a transparent pixel value corresponding to the transparent developer amount for the pixel on the basis of the difference.

2. The image formation apparatus according to claim 1, wherein a minimum value of the second threshold set by the threshold setting unit is 0%.

3. The image formation apparatus according to claim 1, wherein a maximum value of the second threshold set by the threshold setting unit is a total value of a color developer amount and a transparent developer amount which are predetermined for the image formation apparatus.

4. The image formation apparatus according to claim 1, wherein the transparent developer amount calculator calculates a transparent pixel value in accordance with the following formula:
  the transparent pixel value=the second threshold−the second total value where,
  the transparent pixel value=0% if the transparent pixel value<0%, and
  the transparent pixel value=100% if the transparent pixel value>100%.

5. An image formation apparatus for forming an image using color developers and a transparent developer, the image formation apparatus comprising:
  a developer total amount restriction unit configured to calculate, for each pixel of an image to be formed by the color developers, a first total value representing a total value of received color pixel values, and output restricted color pixel values obtained by
    correcting the received color pixel values in such a manner that the first total value is reduced to a predetermined first threshold or below when the first total value exceeds a predetermined first threshold, or
    without correcting the received color pixel values when the first total value does not exceed the predetermined first threshold;
  a maximum total value detection holder configured to detect a maximum total value of the restricted color image values of a pixel among all pixels of an image to be formed with the color developers, and hold the maximum total value thus detected;
  a threshold setting unit configured to set a second threshold based on data received from outside the image formation apparatus;
  a threshold adjuster configured to compare the maximum total value and the second threshold with each other, and output the larger value as a third threshold; and
  a transparent developer amount calculator configured to calculate a difference between the third threshold and a second total value representing a total value of the restricted color pixel values for each pixel, and calculate a transparent pixel value for the pixel corresponding to the transparent developer amount on the basis of the difference.

6. The image formation apparatus according to claim 5, wherein a minimum value of the second threshold set by the threshold setting unit is 0%.

7. The image formation apparatus according to claim 5, wherein a maximum value of the second threshold set by the threshold setting unit is a total value of a color developer amount and a transparent developer amount which are predetermined for the image formation apparatus.

8. The image formation apparatus according to claim 5, wherein the transparent developer amount calculator calculates a transparent pixel value by the following formula:
  the transparent pixel value=the second threshold−the second total value where
  the transparent pixel value=0% if the transparent pixel value<0%, and
  the transparent pixel value=100% if the transparent pixel value>100%.

9. An image formation apparatus for forming, on a medium based on inputted image data, a color image using basic color developers and forming a non-basic color image using a non-basic developer whose color is different from the basic color developers, the image formation apparatus comprising:

a non-basic color developer threshold memory unit configured to store a non-basic color developer threshold (THcl for one pixel; and a non-basic color developer amount calculator configured to calculate a non-basic color developer amount (Clb), which is an amount of the non-basic color developer to be applied to each pixel to form the non-basic color image based on the inputted image data, by the following equation:

$$Clb=THcl-Sum,$$

where Sum represents a total amount of the basic color developers to be applied to each pixel to form the color image based on the inputted image data;

a color developer threshold memory unit configured to store a basic color developer maximum threshold (SumMax), which is an upper limit of the total amount of the basic color developers to be superimposedly applied to one pixel; and a color developer total amount restriction unit configured to, when the inputted image data contains a pixel where the total amount of the basic color developers (Sum) exceeds the basic color developer maximum threshold (SumMax), make color correction by correcting an amount of each of the basic color developers for the corresponding pixel, wherein the non-basic color developer amount calculator is configured to calculate the non-basic color developer amount (Clb) for the corresponding pixel, by the following equation: Clb=THcl−Sum1, where Sum1 represents a total corrected amount of the basic color developers for the corresponding pixel.

10. The image formation apparatus according to claim 6, wherein the non-basic color developer serves as a first color developer, and the basic color developers comprise a second color developer, a third color developer, a fourth color developer, and a fifth color developer, wherein the image formation apparatus further comprises:
a first image formation unit configured to form the non-basic color developer image using the different color developer as the first color developer,
a second image formation unit configured to form a second color developer image using the second color developer,
a third image formation unit configured to form a third color developer image using the third color developer,
a fourth image formation unit configured to form a fourth color developer image using the fourth color developer, and
a fifth image formation unit configured to form a fifth color developer image using the fifth color developer, wherein the basic color developer total amount restriction unit is configured to, when the inputted image data contains a pixel where a total amount (Sum) of the second to fourth color developers exceeds the basic color developer maximum threshold (SumMax), perform color correction for the corresponding pixel to obtain a corrected amount of the second color developer, a corrected amount of the third color developer, a corrected amount of the fourth color developer, a corrected amount of the fifth color developer, for the corresponding pixel, and wherein the non-basic color developer amount calculator is configured to calculate a non-basic color developer amount (Clb1) for the corresponding pixel, by the following equation:

$$Clb1=THcl-Sum2,$$

where Sum2 represents a total of the corrected amounts of the second to fifth color developers for the corresponding pixel.

11. The image formation apparatus according to claim 9, wherein the non-basic color developer serves as a first color developer, and the basic color developers comprise a second color developer, a third color developer, a fourth color developer, and a fifth color developer, wherein the image formation apparatus further comprises:
a first image formation unit configured to form the non-basic color developer image using the different color developer as the first color developer,
a second image formation unit configured to form a second color developer image using the second color developer,
a third image formation unit configured to form a third color developer image using the third color developer,
a fourth image formation unit configured to form a fourth color developer image using the fourth color developer, and
a fifth image formation unit configured to form a fifth color developer image using the fifth color developer, wherein the non-basic color developer amount calculator is configured to calculate the non-basic color developer amount (Clb) to be applied to each pixel to form the non-basic color image based on the inputted image data, by the following equation:

$$Clb=THcl-Sum1,$$

where Sum1 represents a total of the corrected amounts of the second to fifth color developers for the corresponding pixel.

\* \* \* \* \*